March 2, 1965     R. A. SOMERS ETAL     3,171,567
PAD GRIPPING DEVICE FOR HAND-HELD APPLIANCE
Filed Jan. 11, 1962
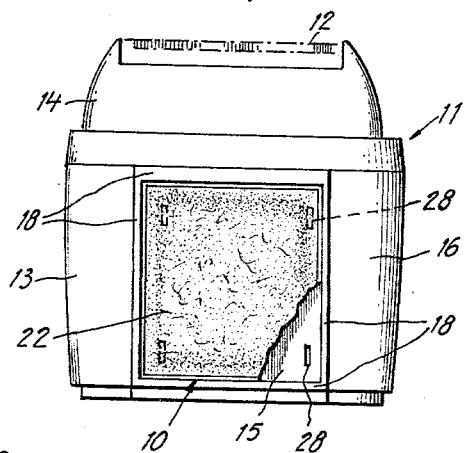
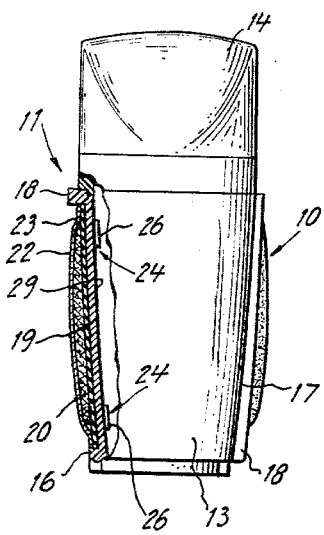
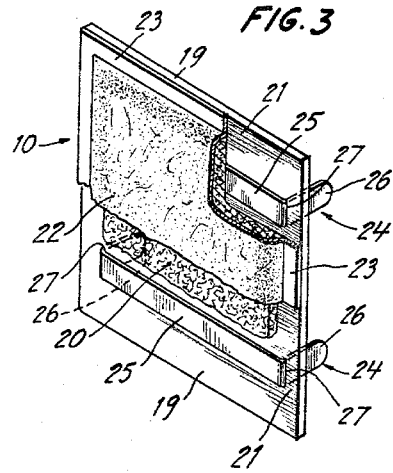
INVENTOR.
RAYMOND A. SOMERS
ROBERT J. TOLMIE
BY
C. H. Miranda
ATTORNEY 3,171,567
PAD GRIPPING DEVICE FOR HAND-HELD
APPLIANCE
Raymond A. Somers and Robert J. Tolmie, Fairfield,
Conn., assignors to Sperry Rand Corporation, New
York, N.Y., a corporation of Delaware
Filed Jan. 11, 1962, Ser. No. 165,547
3 Claims. (Cl. 220—94)

This invention relates to a pad device for attachment to the casing of hand-held appliances such as electric dry shavers and the like.

In the majority of hand-held appliances, the casing is made of a hard premolded plastic material which provides a smooth and slippery casing surface. This is particularly true in electric dry shavers wherein the casing houses an electric motor and mounts a cutter head. In the use of an electric shaver, the casing is held in the cup of a person's hand with opposite side surfaces of the casing gripped by the person's fingers. Usual practice has been to knurl these opposite sides of the casing to provide a gripping or holding area comprised of a series of ribs on the casing surface to assist in preventing the shaver from slipping from the operator's hand during use. Knurling or other known devices such as rubber or leather grips attached to the casing have not proven satisfactory in providing a comfortable holding area for gripping an electric shaver while in operation. In use of these devices, one must maintain a tight and uncomfortable grip on the shaver casing during use to prevent it from slipping from their hands.

An object of the present invention is to provide a novel pad device for attachment to the smooth casing of a hand-held appliance to form a comfortable holding area thereon.

Another object is to provide a novel pad device for attachment to the casing of a hand-held appliance whereby a resilient and comfortable gripping surface may be located at selected areas on the casing.

Still another object is to provide a novel holding area on an electric dry shaver casing without knurling the outer casing surfaces.

A still further object is to provide a novel pad attachment for a hand-held appliance that consists of relatively few parts that may be easily assembled and detachably mounted on the casing of a hand operated appliance.

The present invention contemplates a novel detachable pillow-like pad device containing a layer of resilient material encased in a fabric mounting. The pad is readily attached to a smooth plastic casing to provide a comfortable holding area on the outer surface of the casing. When the instrument to which the pad is attached is operated, the user's fingers grip and frictionally hold the pad and, with a minimum of effort, prevent the casing from slipping out of the hand.

The above and other objects and advantages of the present invention will appear more fully hereinafter from a consideration of the detailed description which follows taken together with the accompanying drawing wherein one embodiment of the invention is illustrated.

In the drawing:

FIGURE 1 is a front elevational view of an electric shaver casing to which is attached one embodiment of the pad device of the present invention;

FIGURE 2 is a side elevational view of the device of FIGURE 1 with a portion of the casing broken away;

FIGURE 3 is an enlarged perspective view of the pad device illustrated in FIGURES 1 and 2 with a portion of the pad device broken away.

Referring now to the drawing for a more detailed description of the present invention and more particularly to FIGURE 1 wherein one preferred embodiment of the invention is shown that novel pad device 10 is illustrated mounted on the outer surface of an electric dry shaver casing generally indicated by the numeral 11. Electric dry shaver casing 11 is of the usual type which encloses a motor (not shown) and supports a cutter head 12 in a well known manner. Casing 11 comprises a premolded main casing section 13 formed of a hard smooth plastic material, as for example nylon, and a removable plastic hair pocket section 14 is fitted over the cutter head 12. It is to be understood that the pad device 10, to be hereinafter fully described, is not limited in any way to the particular casing shown and as will be seen may be readily adapted for use in casings of a wide variety of hand-held appliances.

Rectangular recess portions 15 are formed on opposite side surfaces 16 and 17, respectively, of main casing section 13 and are bounded by premolded casing ribs 18 to each accommodate a rectangular pad device 10. Each pad 10 comprises a base or backing member 19 made preferably of a plastic material such as a stiff vinyl fabric which abuts against the outer surface of the casing section 13 as seen in FIGURE 2. An inner member 20 of pad 10 consisting of a relatively thick layer of resilient materials, such as a vinyl foam substance, is mounted on the front surface of backing member 19 as seen in FIGURE 3 leaving an exposed peripheral marginal surface portion 21. A pad cover or facing member 22 of soft fabric material such as flexible vinyl plastic is disposed over and covers the inner member 20. A peripheral marginal surface 23 of cover member 22 overlies and is affixed to the exposed marginal surface 21 of backing member 19 by heat sealing the marginal surface 23 to marginal surface 21. By reason of the foregoing, a pillow-like pad 10 is provided. It is obvious that the mentioned marginal surfaces 21 and 23 may be secured together by other fastening means such as by an adhesive or stitching.

In most instances, pad 10 may be secured to surfaces 16 and 17 by a suitable adhesive although, in other instances, it may be desired to provide mechanical means for accomplishing same. Accordingly, U-shaped soft brass brackets 24 are set in the pad at the upper and lower portions thereof as shown in FIGURE 3. The bight or strip-like portion 25 of each bracket 24 lies against the front surface of the backing member 19 (FIGURE 3) with bendable tab end members 26 of the bracket extending laterally from strip 25 through slots 27 formed in the backing member 19. In order to securely mount the pad 10 on the casing section 13, the ends 26 are fitted in slots 28 formed in the casing section 13 and then turned back and against the inner wall surface 29 of the casing section 13 as shown in FIGURE 2. It will be understood by those skilled in the art that the means for mounting pad 10 to a casing such as electric shaver casing 11 is not limited to the fastening brackets as pointed out hereinabove. In the illustrated electric shaver casing 11, pad 10 is mounted both on side 16 and on side 17 of the casing section 13 and it can be seen that when the shaver casing 11 is cupped in a person's hand for use, his thumb will engage resilient pad 10 on one side of the casing and the other fingers of his hand will grasp the pad mounted on the opposite side of the casing.

It is apparent from the foregoing that the novel pad member 10 described has many advantages. The pad device provides a comfortable resilient holding area for gripping an otherwise smooth and slippery casing surface and it is economically affixed or detached thereto. If mounted on an electric shaver casing as disclosed, the user's fingers are comfortably embedded in the resilient pad and the possibility of the shaver casing slipping from a person's grasp is greatly reduced.

Although one embodiment of the present invention has been illustrated and described in detail, it is to be ex-

What is claimed is:
1. In a motorized hand-held appliance having a casing adapted to be held in the cupped hand of a user,
   (a) means on the opposite faces of said casing delineating finger holding areas thereon,
   (b) a pillow-like pad gripping member disposed in each finger holding area with one of said pillow-like pad members arranged to receive the thumb and the other pillow-like pad member arranged to receive other fingers of the hand of the user,
   (c) each of said pillow-like pad gripping members including a backing member,
   (d) a resilient cushion disposed on said backing member having the peripheral edges thereof arranged within the peripheral edges of said backing member,
   (e) a flexible cover member disposed over said resilient cushion and having peripheral marginal portions thereof secured to peripheral marginal portions of said backing member, and
   (f) means on said backing members to secure said pillow-like pad gripping members to said casing in said finger holding areas whereby the fingers of the user gripping said pillow-like pad members are embedded in said resilient cushions to prevent the casing from slipping during operation of the appliance.

2. In a motorized hand-held appliance having a casing adapted to be held in the cupped hand of a user,
   (a) recessed portions formed on the opposite faces of said casing delineating finger holding areas of selected configuration on said casing,
   (b) a pillow-like pad member disposed in each finger holding area with one of said pillow-like pad members arranged to receive the thumb and the other pillow-like pad member arranged to receive other fingers of the hand of the user,
   (c) each of said pillow-like pad gripping members including a backing member conforming in configuration to said selected configuration of a said finger holding area of said casing.
   (d) a resilient cushion disposed on said backing member and having the peripheral edges thereof arranged within the peripheral edges of said backing member,
   (e) a flexible cover member disposed over said resilient cushion and having peripheral marginal portions thereof secured to said peripheral marginal portions of said backing member, and
   (f) means on said backing members to secure said pillow-like pad gripping members to said casing within said recessed portions whereby the fingers of the user gripping said pillow-like pad members are embedded in said resilient cushions to prevent the casing from slipping during operation of the appliance.

3. In a motorized hand-held appliance having a casing adapted to be held in the cupped hand of a user,
   (a) recessed portions formed on the opposite faces of said casing delineating finger holding areas of selected configuration thereon,
   (b) a pillow-like pad gripping member disposed in each of said finger holding areas with one of said pillow-like pad members arranged to receive the thumb and the other pillow-like pad member arranged to receive other fingers of the hand of the user,
   (c) each of said pillow-like pad gripping members including a backing member conforming in configuration to said selected configuration of said finger holding area,
   (d) said backing member having a pair of spaced slots formed therein,
   (e) a cushion member disposed on one side of said backing member,
   (f) a cover member of flexible material disposed over said inner cushion member and having peripheral marginal portions secured to peripheral marginal portions of said backing member,
   (g) a bracket carried by each of said pad members with each bracket having tabs thereon extending through said slots in said backing members, and
   (h) slots formed in said casing within each recess portion thereof registering with said slots in said backing members,
   (i) said tabs on said brackets extending through said registered slots and folded back against an interior wall surface of said casing to secure said pillow-like pad gripping members to said casing within said finger holding areas.

References Cited by the Examiner
UNITED STATES PATENTS

| | | | |
|---|---|---|---|
| 1,565,775 | 12/25 | Bash | 30—34 X |
| 1,954,130 | 4/34 | Higgins | 156—293 X |
| 2,174,588 | 10/39 | Manzeck | 16—116.1 |
| 2,207,269 | 7/40 | Schiff | 30—34 |
| 2,878,153 | 3/59 | Hacklander | 30—34 X |
| 3,106,853 | 10/63 | Herr et al. | 16—116 |

THERON E. CONDON, *Primary Examiner.*

EDWARD V. BENHAM, *Examiner.*